No. 758,834. PATENTED MAY 3, 1904.
J. W. GRAYDON.
TOWER FOR RECREATION OR OTHER PURPOSES.
APPLICATION FILED OCT. 23, 1903.
NO MODEL. 6 SHEETS—SHEET 2.

No. 758,834. PATENTED MAY 3, 1904.
J. W. GRAYDON.
TOWER FOR RECREATION OR OTHER PURPOSES.
APPLICATION FILED OCT. 23, 1903.
NO MODEL. 6 SHEETS—SHEET 3.

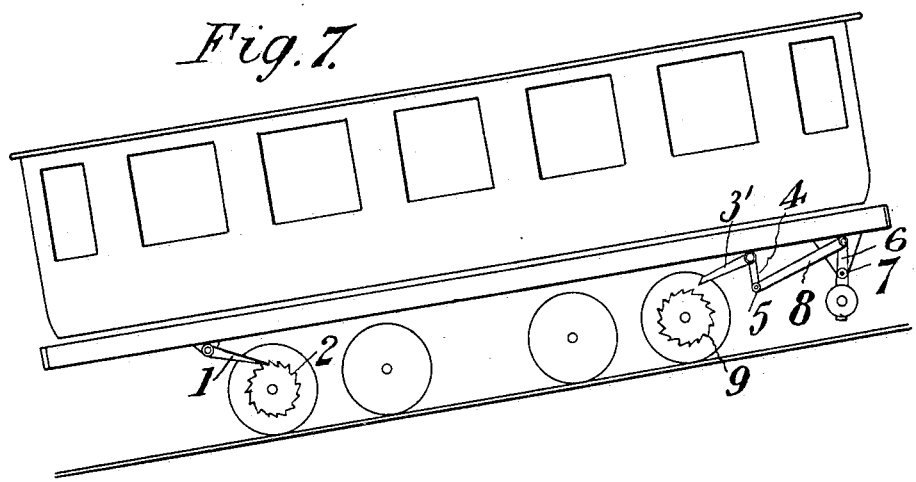
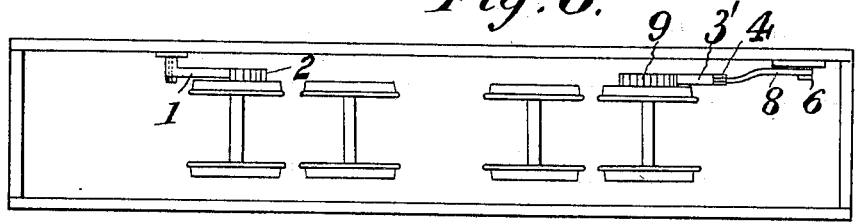
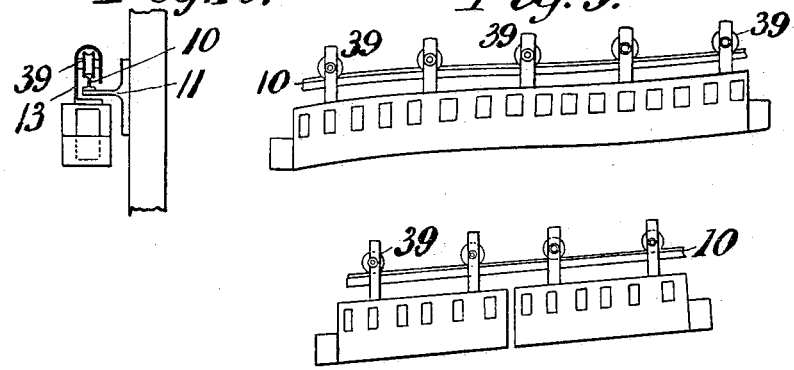

No. 758,834. PATENTED MAY 3, 1904.
J. W. GRAYDON.
TOWER FOR RECREATION OR OTHER PURPOSES.
APPLICATION FILED OCT. 23, 1903.
NO MODEL. 6 SHEETS—SHEET 5.
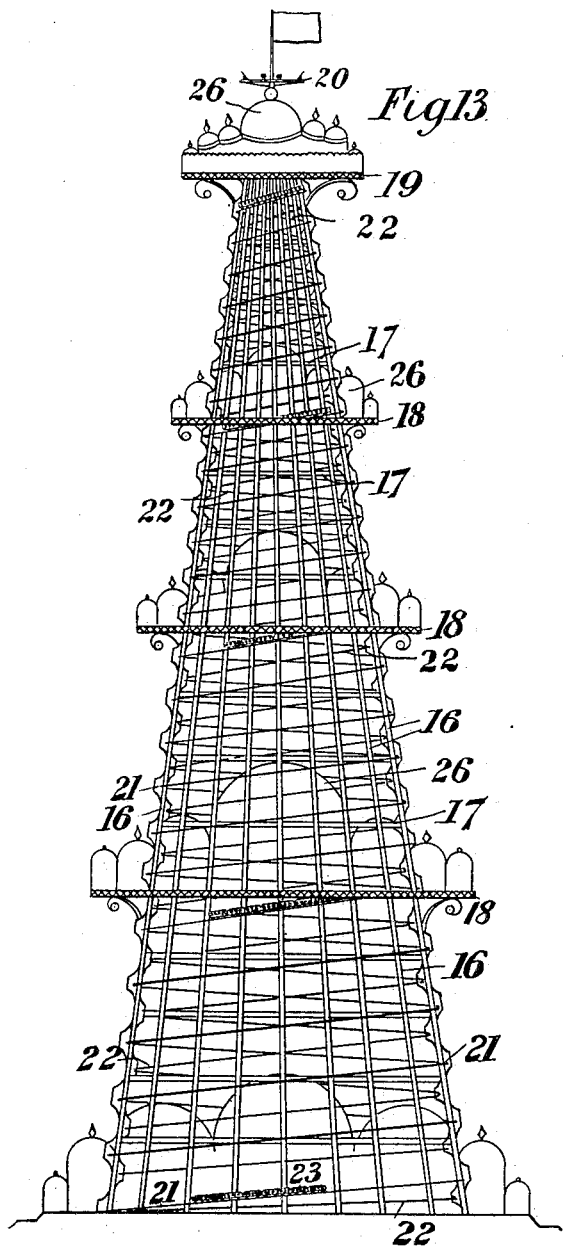

No. 758,834. PATENTED MAY 3, 1904.
J. W. GRAYDON.
TOWER FOR RECREATION OR OTHER PURPOSES.
APPLICATION FILED OCT. 23, 1903.
NO MODEL. 6 SHEETS—SHEET 6.
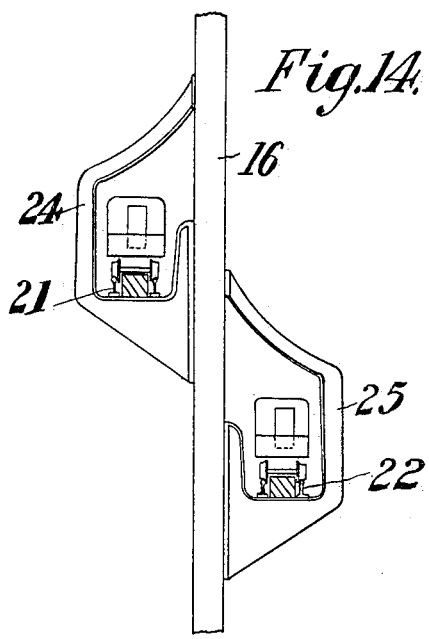
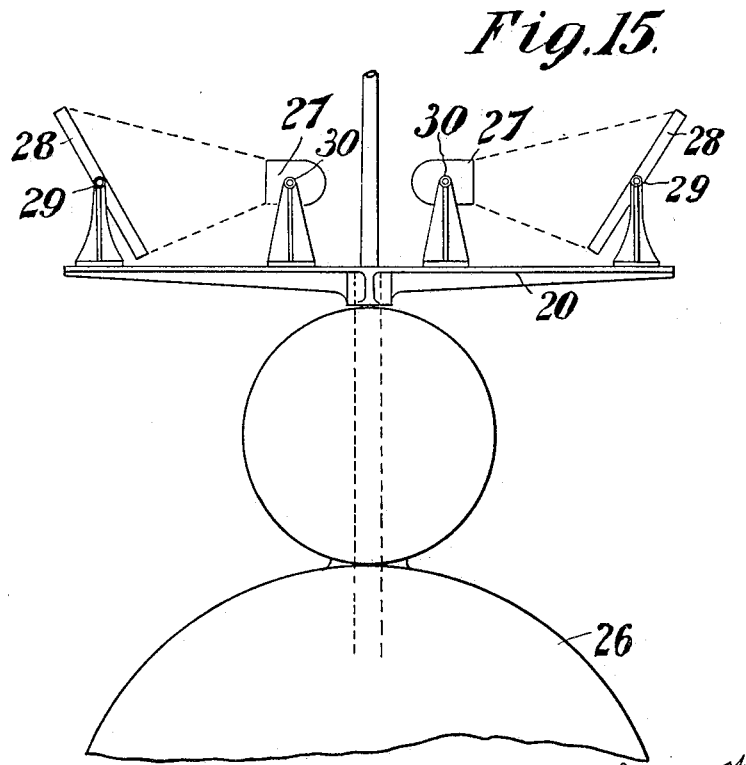

No. 758,834. Patented May 3, 1904.

UNITED STATES PATENT OFFICE.

JAMES WEIR GRAYDON, OF PECKHAM, ENGLAND.

TOWER FOR RECREATION OR OTHER PURPOSES.

SPECIFICATION forming part of Letters Patent No. 758,834, dated May 3, 1904.

Application filed October 23, 1903. Serial No. 178,288. (No model.)

*To all whom it may concern:*

Be it known that I, JAMES WEIR GRAYDON, late lieutenant in the United States Navy, a citizen of the United States, residing at No. 6 York Grove, Peckham, in the county of Surrey, England, have invented new and useful Improvements in and Relating to Towers for Recreation or other Purposes, of which the following is a specification.

This invention relates to improvements in towers for recreation and other purposes provided with spiral or helical railways; and it consists in so constructing such towers that the cars or carriages used therewith cannot leave the helical or spiral rails. It also relates to a special construction of car to be used on the railways, to connecting the ascending and descending cars together, so as to balance each other, so that they do not require a great amount of motive power to propel them, and to special means for preventing the cars from running back if the cable or other means of propulsion were to break or fail.

Figure 1:
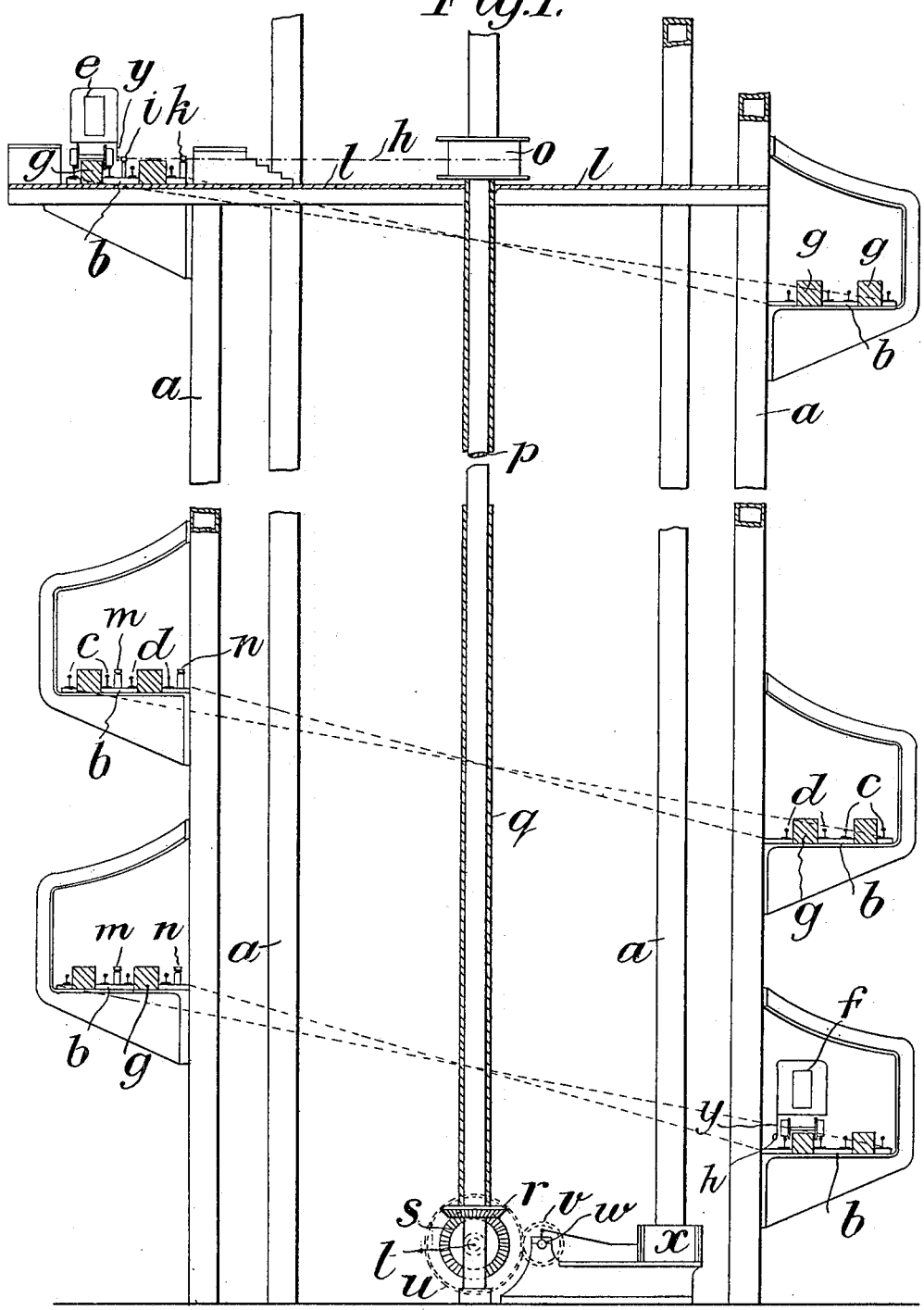
Figure 2:
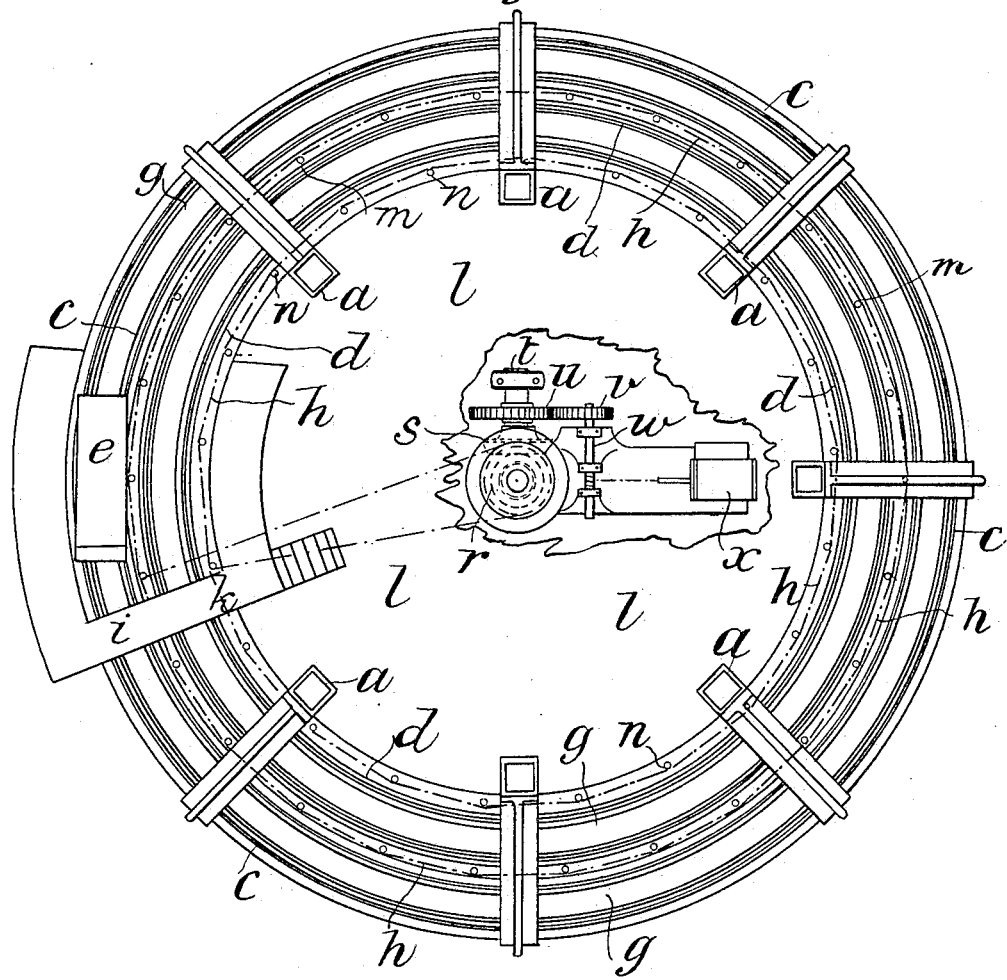
Figure 3:
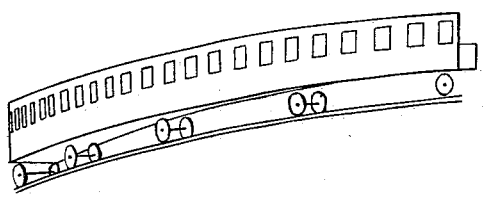
Figure 4:
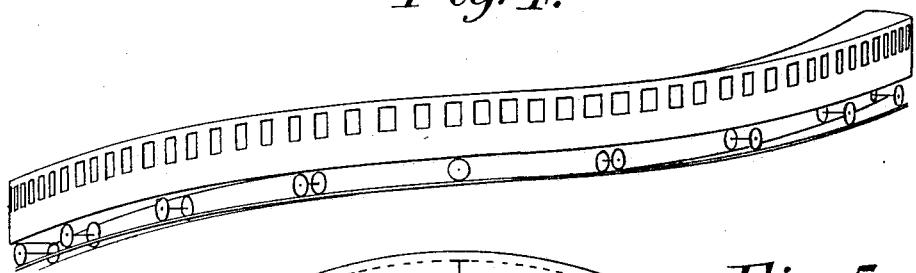
Figure 5:
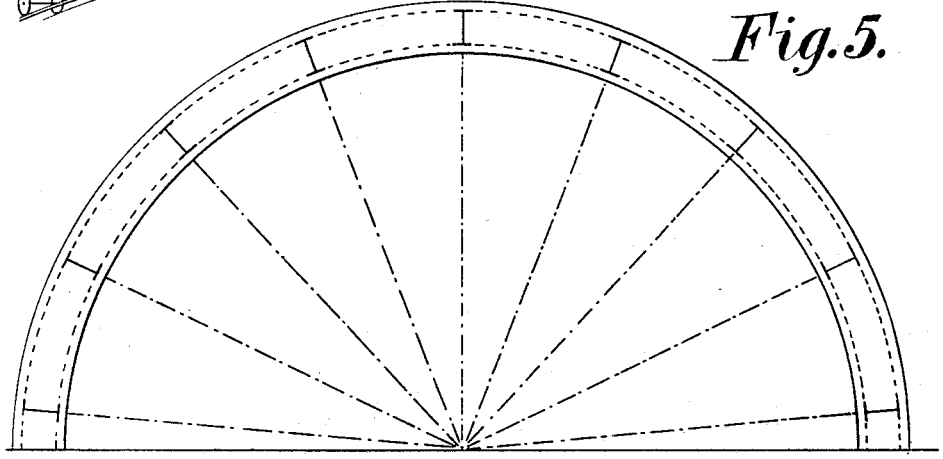
Figure 6:
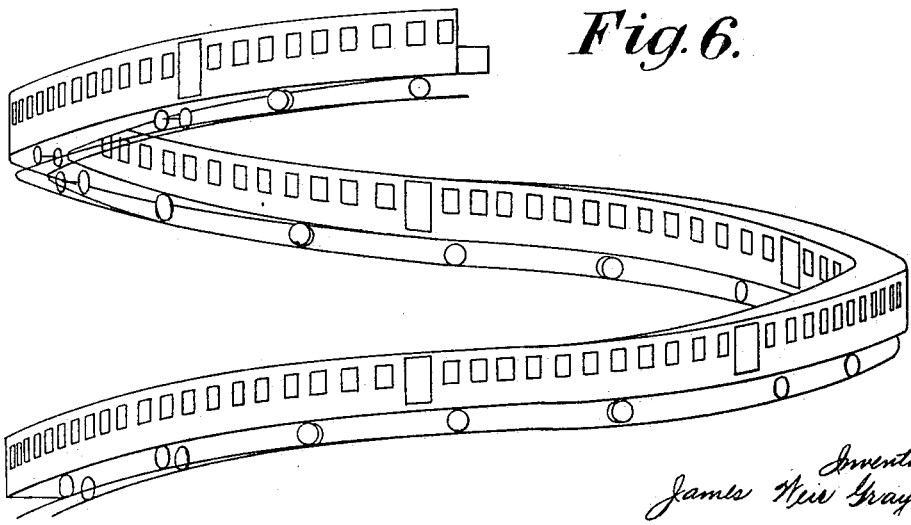

Figure 1 of the accompanying drawings illustrates in sectional elevation a recreation-tower constructed according to this invention. Fig. 2 is a plan thereof. Fig. 3 is an elevation of a car constructed in the form of a quarter-turn of a helix. Fig. 4 is a similar view of a car constructed in the form of a half-turn of a helix. Fig. 5 is an inverted plan thereof. Fig. 6 in like manner represents a car forming a turn and a half of a helix. Fig. 7 is an elevation of a simple car drawn to a somewhat larger scale with pawls to prevent the car running away in case a cable or cable-gripper breaks or if the motor on the car breaks down or if the brakes fail to act, and Fig. 8 is an inverted plan of the same. Fig. 9 is an elevation of a helical car suspended from a single rail, and Fig. 10 is an end elevation thereof. Fig. 11 is an elevation of a train of cars suspended from a single rail. Fig. 12 is an end elevation of a car running on a single central rail. Fig. 13 is a view, partly in elevation and partly in section, of a recreation-tower tapering toward the summit. Fig. 14 is a sectional elevation of a detail of said taper tower; and Fig. 15 is a view, partly in elevation and partly in section, of the upper part of a tower provided with search-lights and mirrors for making displays of light.

The recreation-tower is preferably constructed of steel; but it may be made of other materials. If constructed of steel or iron, it is suitably composed of a number of legs *a*, Figs. 1 and 2, made of box-girders, which are stayed or connected together in any well-known manner, thus forming a high massive metal tower of great diameter. The spiral railway *b* is built or supported on the outside of the legs and may either have one track or, as shown, two tracks, (marked *c* and *d*.) The tracks in this particular example consist of two rails, on which run the cars *e* and *f*, and with a projecting guide *g* between the rails, constructed in such manner that the wheels of the cars are nearly in contact with the said guides for the purpose of preventing the wheels of the cars becoming derailed in case the centrifugal force should cause the wheels to mount the rails. The cars *e* on the outside and the cars *f* on the inside tracks are connected together by means of a cable *h*, which suitably passes round pulleys *i* and *k*, mounted on the upper platform *l*, and at proper distances round the spiral tracks there are guide-pulleys *m* and *n*, the former for the outer track and the latter for the inner track. The said cable *h* is conveniently driven by means of a drum *o*, round which the cable is wound once or more than once, and the drum is mounted on a shaft *p*, suitably passing down through a tube or tubular bearing *q* to the bottom of the tower. At the bottom there is a miter-wheel *r*, meshing with a miter-wheel *s*, mounted on a horizontal shaft *t*, on which is also keyed a gear-wheel *u*, meshing with another gear-wheel *v*, keyed to the shaft *w* of the engine *x*, or other suitable gearing may be employed. When the engine revolves in one direction, the cable is wound round the drum *o*, and being connected at each end by grippers *y* or otherwise to the cars *e* and *f* one car *e* is caused to ascend while the other car *f* descends, and when the latter arrives at the bottom the car *e* is at the top. Motion is then communicated to the drum *o* in the opposite direction, and the car *e* descends while the car *f* ascends, and so on. The carriages or cars may be run in trains or singly; but it is preferable that they should run in trains, if the number of passengers requires it, rather than several isolated cars should run, and when one train is opposite a platform then the other train or trains are also opposite another platform or other platforms if there be intermediate platforms.

It is evident that clutches and reversing-gear may be employed, and then the engine may always be caused to revolve in one direction.

It is not essential that cable propulsion be employed, as other means of propelling the cars may be used; but in any case it is preferable for the cars to be connected together by cable under any circumstances, as by that means the weights of the cars balance each other, or do so approximately.

One car or a plurality of cars coupled together may be attached to each end of the cable or be otherwise propelled up and down, and it is not absolutely essential that there should be two or more tracks, as one car or one train of cars may be propelled up and down one track. If, however, it be necessary to accommodate several people, several cars are employed; but instead of using several cars I prefer to build a long car in the form of a helix or part of a helix. Fig. 3 shows a car made in the form of a quarter of a turn of a helix with a platform at each end to enter and descend from the car, as is usual, or doors at the side may be used. Fig. 4 represents a car made in the form of a half-turn of a helix, while Fig. 5 shows the arrangement of the axles. These in this case and in all spiral cars are made to radiate from the center of the curve of the track or tracks, and as the outside wheels have to revolve more quickly than the wheels on the inner rail one or both wheels on each axle are loose on the latter. Fig. 6 shows an example of car consisting of a turn and a quarter adapted to carry a great number of people. Cars constructed in this manner are extremely safe, and the axles being arranged radially there is very little, if any, friction set up; nor are the cars liable to leave the rails owing to centrifugal force.

As shown in Figs. 7 and 8, the cars, or one or more of them, are suitably provided with ratchets or pawls which take into pawl-wheels forming part of the car-wheels. In the example shown the car is intended for use where the cars ascend, for example, on one track and descend on another track, there being connecting curved rails at the top and bottom of the tower to connect the ascending and descending tracks, or the cars may ascend and descend on one track if there is a loop-track at the bottom of the tower and at the top thereof. In such a case the cars always travel in the same direction. When ascending, there is a danger of the car running back if the driving or propelling gear should break down, and to obviate this the said car is provided with a pawl or pawls, such as 1, which take onto the ratchet-wheel 2, mounted on the wheel 3 or the axle thereof. When the car is descending, it is prevented from running away by means of the pawl 3′ having the lever 4 in one therewith, said pawl-lever being mounted on the fulcrum 5 on the car-frame and connected to the weighted double-armed lever 6, fulcrumed at 7 by a link 8. If the car should travel too quickly on the downgrade, there is a tendency for the lower end of the weighted lever to swing back with regard to the car, which by the connecting-link 8 has the effect of putting the pawl 3 into contact with the teeth of the pawl-wheel. This latter may either be fixed to the wheel 9 or may be connected thereto by means of a coiled spring to lessen the shock when the pawl engages the pawl-wheel.

Figs. 9 and 10 illustrate a helical car such as has been described with reference to Fig. 3, but suspended by its flanged wheels 39 on the rail 10, which is mounted on the brackets 11, attached to the box-girder 12 or other suitable part of the tower structure. In the example shown the strap or bracket 13 passes right over the top of the wheel and extends below the level of the top of the rail to prevent the wheels running off the rail, or the flanges may be made deeper for the same purpose. Fig. 11 shows a similar mode of suspension applied to ordinary short cars coupled together and needs no further explanation.

Fig. 12 shows the arrangement of a car mounted on wheels 14 running on a single rail 15, with the center of gravity of the car below the level of the rail.

The recreation-tower shown in Fig. 13 is composed of a number of legs 16, suitably consisting of steel box-girders joined together by suitable cross or diagonal girders 17, or both, forming a massive steel tower of greater diameter at the base than at the top, with intermediate platforms or floors 18 situated at suitable distances from the base and with a platform 19 near the top, on which platforms 18 and 19, or on some of them, may be constructed pavilions or other structures 26 suitable for recreation and other purposes. On top of the tower is placed a smaller platform 20 for supporting search-lights and other apparatus for producing a monument of light and other displays. The outer spiral railway 21 is mounted on the outside of the legs 16 and on reaching the platform 19 describes approximately a circle and continues downward spirally, as shown at 22, to form an inner spiral railway and joins at the bottom with the outer spiral railway, so as to form two complete spirals joined together at the top and at the bottom. The cars 23 may therefore ascend by the outer spiral railway 21 and descend by the inner track 22, or they may ascend inside of the tower and descend on the outside. Fig. 14 shows the way the outside track 21 and inside track 22 are mounted in brackets 24 and 25, respectively, fixed to the legs 16. The railway system employed may be the monorail, or with two rails, as usual, or even three rails, or the cars may be suspended, all as hereinbefore referred to. The cars may be propelled by cable, or by electricity, or by steam or gas or oil, all as found most convenient according to circumstances. If a cable be employed, the same passes round rollers, as before described, to prevent friction and to guide the cable round the curves. An observatory or observatories may be built on the upper platform 19, if desired, and ballrooms, restaurants, skating-rinks, clubs, and bazaars are built on the ground at the base of the tower or on the platforms 18 or 19, and the tower described with reference to Figs. 1 and 2 may also be provided with such platforms. There may be promenades up and down the spiral tracks or at the side of them, either inside or outside, or both, by enlarging the floor thereof and protecting pedestrians from the cars by wire-netting or the like. There may also be spiral pathways or stairs, or both, and special arrangements for fireworks and other displays. If desired, lifts or elevators may be arranged within or without the tower, but preferably inside, to carry passengers between the bottom to the top or intermediate floors or platforms, and slanting supporting cables or guys from the top of the tower or from intermediate places may be anchored to the ground, and these cables may be used as aerial railways on which run suspended cars up and down.

The apparatus for producing displays of light, illustrated in Fig. 15, comprises a number of powerful search-lights 27 and a number of large mirrors 28, mounted on the platform 20, which may be revolved by the vertical shaft $p$ (shown in Fig. 1) or otherwise. The search-lights direct their rays or beams of light onto the mirrors, whose adjustment on their pivots 29 will direct the beams of light, forming a monument of light, or the direction of the search-lights may be altered by turning them on their trunnions, and different-colored lights may be produced by colored screens in any well-known manner. Beams of light may be projected onto the clouds either directly or by means of the mirrors, and the latter may be provided with images, letters, or words which will interrupt the beams of light, and thus show shadows on the clouds or other objects onto which the light may be thrown.

Brakes of any suitable construction may be employed, adapted either to brake onto the wheels, or onto the rail or rails, or onto the wheels and rails, or onto the central spiral guide, or onto the latter and onto the wheels or the rails.

What I claim as my invention, and desire to secure by Letters Patent, is—

1. A recreation-tower comprising a tower-like structure, a spiral railway thereon, a car or cars adapted to run on said way, a driving-shaft extending axially through the tower from top to bottom, a cable-drum on said shaft, an endless cable winding on said drum and connected to the car or cars and means to drive the aforesaid shaft, substantially as and for the purposes set forth.

2. A recreation-tower comprising a tower-like structure, a spiral railway thereon, a car or cars adapted to run on said way, a driving-shaft extending axially through the tower from top to bottom, a tubular bearing for the shaft extending nearly the full length thereof, a cable-drum on said shaft, an endless cable winding on said drum and connected to the car or cars and means to drive the aforesaid shaft, substantially as and for the purposes set forth.

3. A recreation-tower, comprising a tower-like structure, a platform at its upper end, a spiral railway on said structure, a car or cars adapted to run on said way, a driving-shaft extending axially through the structure, a driving-drum on said shaft above the upper platform, means at the foot of the shaft to drive the same and an endless cable connected to the car or cars and driven by the aforesaid drum, substantially as and for the purposes set forth.

4. A recreation-tower comprising a tower-like structure, a spiral railway thereon, a car or cars adapted to run on said way, means for propelling said car or cars, a spiral projecting guide between the rails of the railway, means to prevent an ascending car or cars from running back, and means to prevent excessive speed of the descending car or cars, substantially as and for the purposes set forth.

5. A recreation-tower comprising a tower-like structure, a spiral railway-track thereon, a spiral car or cars made to correspond to the curve and pitch of the spiral track and adapted to run on said rails, means for propelling the said car or cars and car-wheels mounted on axles arranged radially to the center of the curve substantially as and for the purpose set forth.

6. A recreation-tower comprising a tower-like structure, a spiral railway-track thereon, a spiral car or cars adapted to run on said rails, means for propelling the said car or cars and a spiral projecting guide between the rails substantially as set forth.

7. A recreation-tower comprising a tower-like structure, a spiral railway-track thereon, a plurality of cars connected together by an endless cable and adapted to run on said rails, the said cable, means for propelling the said car or cars and a spiral projecting guide between the rails substantially as and for the purposes set forth.

8. A recreation-tower comprising a tower-like structure, a spiral railway-track thereon, a plurality of cars connected together by an endless cable and adapted to run on said rails, the said cable, a drum round which the said cable passes, a shaft on which the said drum is mounted, means for causing the said shaft to revolve and a spiral projecting guide between the said rails substantially as set forth.

9. A recreation-tower comprising a tower-like structure, a spiral railway-track thereon, a plurality of cars connected together by an endless cable and adapted to run on said rails, the said cable, pulleys for guiding the cable round the curves of the tower, a drum round which the said cable passes, a shaft on which the said drum is mounted and means for causing the said shaft to revolve substantially as set forth.

10. A recreation-tower comprising a tower-like structure, a spiral railway-track thereon, a car or cars adapted to run on said rails, means for propelling the said car or cars, a pawl pivoted at one end of a car adapted to engage a pawl-wheel mounted on one of the wheel-axles, the said pawl-wheel, another pawl-wheel mounted on a wheel-axle, a pivoted pawl, a weighted lever and a connection between the said pawl and lever substantially as and for the purposes set forth.

11. A recreation-tower comprising a tower-like structure, a fixed platform or platforms on the said tower a revolving platform at the top of the said tower, means for causing the said platform to revolve, search-lights and mirrors on the said revolving platform, a spiral railway-track on the said tower, a car or cars adapted to run on said rails, means for propelling the said cars, and a spiral projecting guide between the rails substantially as set forth.

In testimony whereof I have signed my name to this specification in the presence of two subscribing witnesses.

JAMES WEIR GRAYDON.

Witnesses:
   V. JENSEN,
   W. M. HARRIS.